United States Patent [19]

van der Lely et al.

[11] 4,148,176
[45] Apr. 10, 1979

[54] HAY MAKING MACHINE

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 814,467

[22] Filed: Jul. 12, 1977

[30] Foreign Application Priority Data

Jul. 16, 1976 [NL] Netherlands .................... 7607884

[51] Int. Cl.² .................................... A01D 79/09
[52] U.S. Cl. ................................. 56/370; 56/366
[58] Field of Search ............... 56/370, 365, 366, 377

[56] References Cited

U.S. PATENT DOCUMENTS

| 3,827,224 | 8/1974 | Mulder et al. | 56/370 |
| 3,910,020 | 10/1975 | Spindler | 56/370 |
| 3,992,863 | 11/1976 | van der Lely et al. | 56/370 |
| 4,015,411 | 4/1977 | van der Lely et al. | 56/366 |
| 4,048,793 | 9/1977 | van der Lely et al. | 56/370 |

FOREIGN PATENT DOCUMENTS

| 2304271 | 3/1976 | France | 56/370 |
| 2304273 | 3/1976 | France | 56/370 |

*Primary Examiner*—Russell R. Kinsey
*Attorney, Agent, or Firm*—William B. Mason; Penrose L. Albright

[57] ABSTRACT

A haymaking machine has two side-by-side rake wheels that are driven to rotate about upwardly extending axes and move crop between the wheels. Converging guide walls of horizontal rods are positioned in front of the rake wheels and some of the rods extend rearwardly to intersect the working paths of the wheels. Preferably the walls are located above the wheels. Each wheel has arms pivoted to a central portion and groups of tines are pivoted to the outer ends of the arms to turn about horizontal axes. Each group of tines is mounted on a carrier by coils that surround a tube so that the coils can be turned relative to the tube about a vertical axis and set in swath or tedding positions. Swath guides can be positioned at the rear of the rake wheels.

36 Claims, 6 Drawing Figures

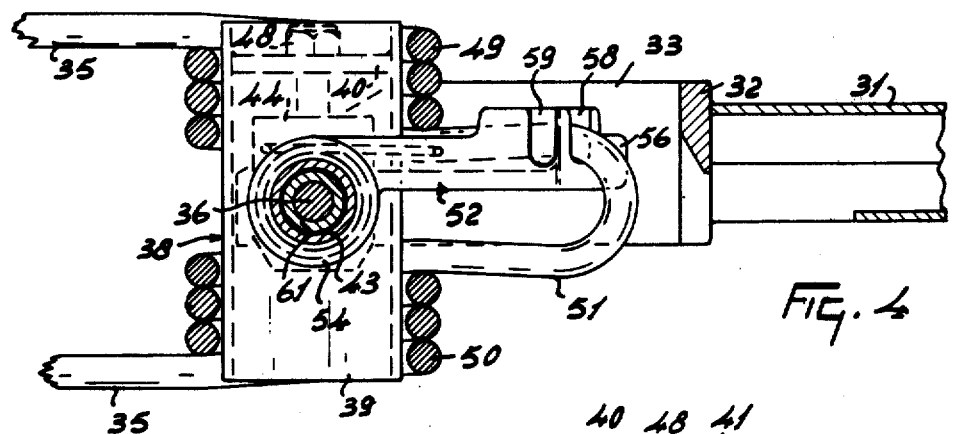
FIG. 4
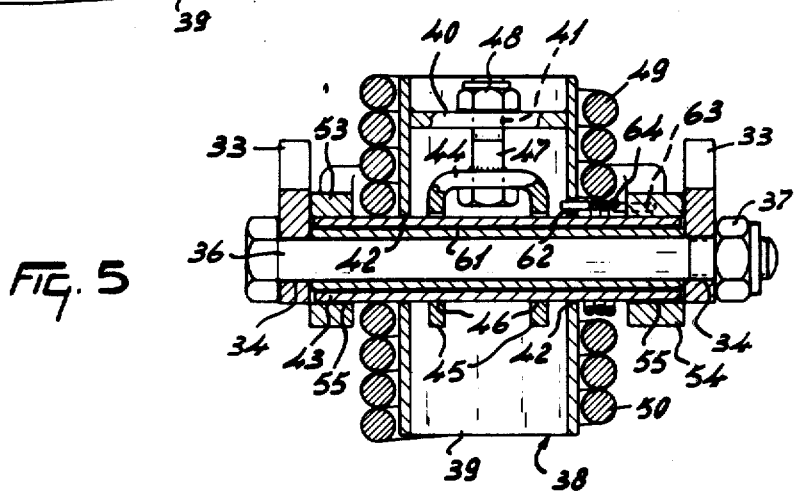
FIG. 5
FIG. 6
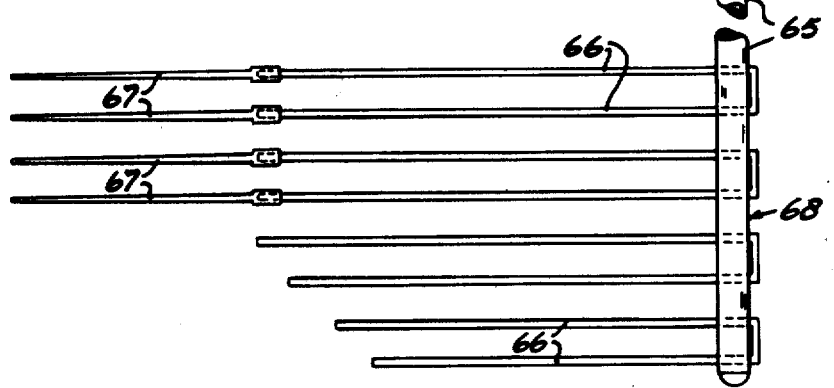

HAY MAKING MACHINE

This invention relates to a hay-making machine.

According to the present invention there is provided a hay-making machine comprising at least two rake members which are connected to be driven in mutually opposite directions of rotation about upright axes and which are provided with tines extending, in operation, generally parallel to the ground over at least a major part of their operative length, there being provided, in front of the rake members with respect to the intended direction of travel of the machine, a crop guide arrangement comprising two side walls which converge towards the rear, these side walls being generally upright and spaced above the ground and being disposed in respective planes each of which intersects the path of movement of the tines of a respective one of the rake members.

In use of embodiments in accordance with the present invention, crop lying centrally in front of the rake members between the side walls is guided towards the central region between the rake members. Moreover, the rake members can feed crop from beneath the side walls towards the region between the side walls. If the quantity of crop to be displaced is very large, some crop may engage the outer sides of side walls and be displaced rearwardly over the top of the rake member. Thus a uniformly distributed crop or an appropriate swath can be achieved. The present invention is particularly relevant to rake members having an external flat portion, and those having a large diameter, for example 2 meters.

For a better understanding of the present invention and to show how the same may be carried into effect, reference will be made by way of example to the accompanying drawings, in which:

FIG. 4 shows on a still larger scale a portion of the rake member of FIG. 3;

FIG. 5 is a sectional view taken along the line V—V in FIG. 3; and

FIG. 6 shows on an enlarged scale a further part of the machine of FIGS. 1 and 2.

Figure 1:
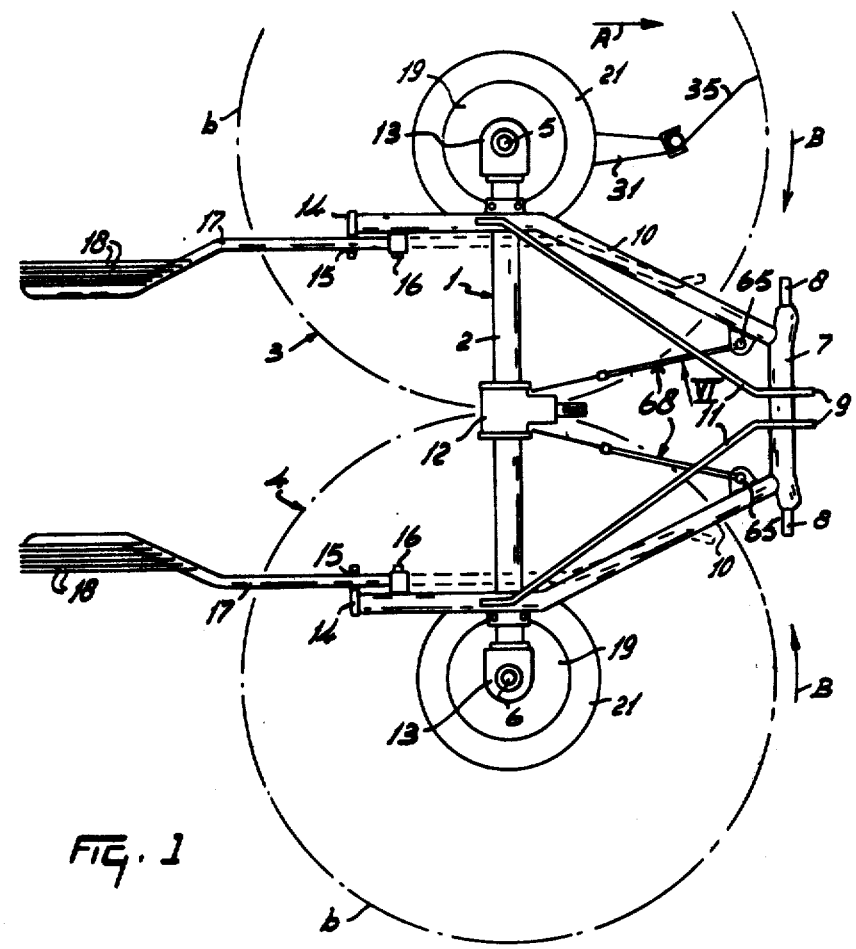
FIG. 1 is a plan view of a hay-making machine.

The hay-making machine shown in the drawings comprises a frame 1 having a frame beam 2, extending transversely of the intended direction of travel A and having at its ends partly overlapping rake members 3 and 4, which are rotatable about parallel, upright and slightly forwardly inclined shafts 5 and 6 respectively. The frame 1 includes a hitch 7 for attaching the machine to a lifting device of a tractor (not shown). The hitch 7 is mainly formed by a curved tube shaped in the form of an inverted U, whose limbs diverge downwardly. Near the free ends this tube has fastening pins 8 for attaching it to the lower arms of the tractor lifting device, whereas near the top of the tube a fastening member 9 is provided for securing the hitch to the top arm of the lifting device. The top arm of the lifting device can be varied in length to enable the position of the machine to be varied. Near the lower ends of the hitch 7 two substantially horizontal supporting tubes 10 are secured thereto which diverge rearwardly and are fastened to the frame beam 2 at their rear ends near the bearings of the rake members 3 and 4. At the top of the hitch 7, near the center, two supporting rods 11 are secured, which also diverge towards the rear and which are arranged symmetrically with respect to the vertical longitudinal plane of the machine. They are sloped downwardly towards the rear and are connected at their rear ends to the supporting tubes 10 with the frame beam 2. A gear box 12 is secured to the center of the frame beam 2, midway between the rotary shafts 5 and 6 of the rake members. The gear box 12 has an input shaft projecting forwardly which is intended for connection, through an auxiliary shaft (not shown), with a power take-off shaft of the tractor.

The gear box 12 has two output shafts, journaled in the hollow frame beam 2, for driving the rake members 3 and 4 in rotation.

At each end the frame beam 2 has rigidly secured thereto a gear box 13. Each of these gear boxes 13 has gear transmission (not shown) for driving the rotary shafts 5 and 6.

Figure 2:
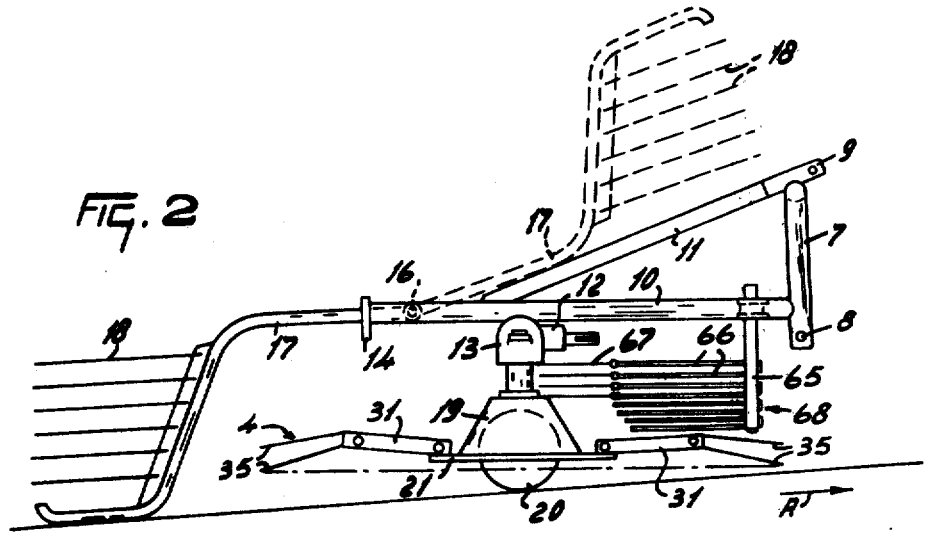
FIG. 2 is a side elevation of the machine of FIG. 1.

The supporting tubes 10 extend beyond the frame beam 2 in a direction perpendicular to the frame beam, that is to say, in the direction of travel A. Viewed on plan, the two supporting tubes 10 diverge rearwardly from the hitch 7 and have a bend located approximately at the frame beam 2 or slightly in front of it. Near its rear end, each supporting tube 10 has a supporting plate 14 which projects inwardly and is parallel to a vertical plane transverse of the direction of travel A; a U-shaped recess is formed at the top of each plate, near the free end. At a short distance in front of the supporting plate 14 each tube 10 has secured to it an inwardly projecting pivotal shaft 16, extending transversely of the direction of travel A. Mounted on each pivotal shaft 16 for pivotal movement is an arm 17 which extends rearwardly from the pivotal shaft; when the machine is operating, this arm does not quite seat in the U-shaped recess 15, but when the machine is elevated by the lifting device of the tractor, it does rest in the recess. In operation each arm 17 extends from the pivotal shaft 16 approximately horizontally to the rear up to a point which, viewed on plan, is slightly behind the paths b described by the tines of the rake members. The arm curves downwardly and slightly inwardly, and then curves again to lie parallel to its front part. The downardly and slightly inwardly inclined portion of the arm 17 is provided with a plurality of super imposed spring steel rods 18 forming a guide for the crop. These two guides formed by the rods 18 on the arms 17 converge downwardly and towards the rear (FIG. 1). In FIGS. 1 and 2 the guides are shown in two positions. In the positions indicated by solid lines the guides are operative to form swaths, and in the positions indicated by broken lines they are turned upwardly about the shafts 16 so that they are in-operative and bear on the rods 11.

Figure 3:
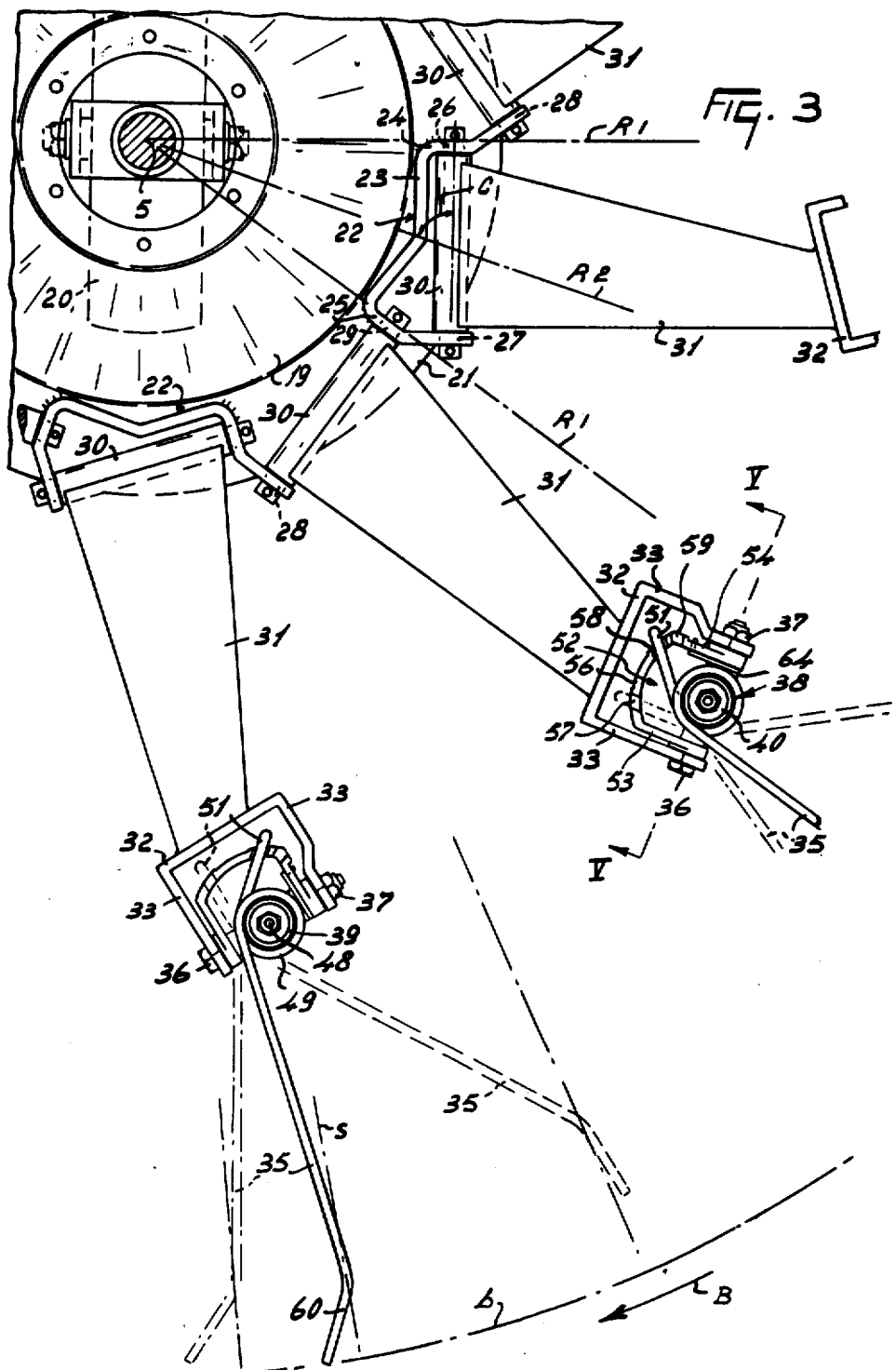
FIG. 3 is an enlarged plan view of a portion of a rake member of the machine of FIGS. 1 and 2.

Each of the rake members 3 and 4 has a hub 19 in the shape of a truncated cone. Beneath each rake member is arranged a ground wheel 20 which is vertically adjustable and which supports the machine during operation. The hub 19 (FIG. 3) is provided at its lower edge with an outwardly projecting flange 21 which extends slightly downwards. The flange 21 is provided with a plurality of brackets 22 each having a portion 23 located near the hub and two limbs 24 and 25 extending outwardly with respect to the rotary shaft. The two limbs 24 and 25 are bent so as to trail with respect to the direction of rotation B and lie substantially parallel to a plane perpendicular to the rotary shaft 5. The portion of the limb 24 adjoining the portion 23 has an opening 26, which is aligned with an opening 27 in the end portion of the limb 25. The rake member comprises a plurality of these brackets 22 spaced apart by a distance corresponding with the distance between the openings 26 and 27. The limb 24 has a second opening 28 in its outer end portion. The limb 25 has also a second opening 29 in the portion adjoining the portion 23. The brackets are disposed and the limbs are bent so that the portion of the limb 25 joining the portion 23 is parallel to the freely projecting portion of the limb 24 of the adjacent bracket in the direction of movement. Moreover, the openings 28 and 29 of the two adjacent brackets are in line with one another. On each bracket the portions having the openings 26 and 27 are parallel to one another. The brackets are preferably made from strip material, but they may also be of cast material. In this embodiment the brackets are welded to the flange 21. It should be noted that the portion 23 of each bracket is bent, one portion near the limb 24 extending parallel to the common center line of the openings 26 and 27, whereas the other portion is substantially parallel to the center line of the opening 29 and hence also of the opening 28 of the adjacent bracket in the direction of rotation. The openings 26, 27, and 28, 29 respectively hold pivotal shafts 30 carrying arms 31. These pivotal shafts can turn in the openings, but they are locked in position against axial displacement. In this embodiment each pivotal shaft is substantially perpendicular to a radial line R passing through the outward side of the portion of the limb 24 and 25 respectively containing the hole (not shown in the drawings) through which the trailing end of the respective pivotal shaft passes. The pivotal shafts are each at an angle of about 73° to a radial line extending from the axis of the shaft 5 to the midpoint of the pivotal shaft 30. This angle opens rearwardly with respect to the direction of rotation B. Thus the opening 29 is nearer to the rotary shaft 5 than is the opening 28. With this construction the arms can better match unevennesses of the ground than would be the case if the pivotal shafts were tangentially arranged. The arms 31 are preferably identical with each other and so the structure will be described for only one of them. The leading edge of the arm, viewed in the direction of rotation B, is substantially perpendicular to the pivotal shaft 30. At the end the arm has a bracket 32 extending substantially parallel to the plane going also through the shaft 30. The bracket 32 has limbs 33, which are at an angle of 22° to the radial line R. The limbs 33 are perpendicular to the web of the U-shaped bracket 32. The limbs 33 of the brackets 32 have aligned openings 34 and as will be described hereinafter the tines 35 of the rake member are adapted to turn about the common center line of these openings. Through the openings 34 of the brackets 32 extends a bolt 36, fastened by a nut 37, for pivotally connecting a tine carrier 38 to the bracket (FIG. 5). FIG. 3 shows that the bolt 36 is at an angle of 22° to a tangential line going through the center of the bolt. The trailing end of the bolt is at a smaller distance from the shaft 5 than is the leading end. Again, this helps the tines to satisfactory follow unevennesses of the ground.

The tine carrier comprises a tube 39 having a transverse partition 40. This transverse partition has an opening 41, whose center line coincides with the center line of the tube 39. The tube 39 has furthermore two diametrically opposite aligned openings 42 in its wall. Through these openings extends a sleeve 43.

The tube 39 accomodates a bracket 44. This bracket 44 is U-shaped with limbs 45 having aligned openings 46. The openings 46 are larger than the diameter of the sleeve 43. The openings 46 may be circular or slot-shaped. The top side of the bracket 44 is provided with a screw bolt 47, which extends through the openings 41 of the transverse partition 40 and can be fixed in place by a nut 48. By means of the bracket 44 the sleeve 43 can be clamped tightly in the tube 39 by tightening the nut 48. The tube 39 is surrounded by two coils 49 and 50 of the tines 35. The two coils are interconnected by a loop 51 and the two superimposed tines 35, the coils 49 and 50 and the loop 51 from an integral unit comprising a group of tines. The loop 51 extends opposite the direction of the tines and is at an angle of about 150° to that portion of the upper tine 35 which joins the coil 49. Around the tube 39 and inside the bracket 32 is arranged a bracket 52 having two limbs 53 and 54 having registering openings 55, which receive the sleeve 43. The distance across the limbs 53 and 54 of the bracket 52 in the area of the openings 55 is slightly smaller than the distance between the limbs 33 of the bracket 32. Between the limbs 53 and 54 the bracket 52 has an intermediate portion 56 having three recesses 57, 58, 59, whose dimensions correspond generally to the thickness of the loop 51. The intermediate portion 56 of the bracket 52 has a thickness which is smaller that the distance between the two portions of the loop 51 so that the loop can move around the bracket. The recesses 57, 58 and 59 define three operating positions of the tines 35 attainable by turning the tines around the tube 39. An intermediate operating position of the upper tine is indicated by solid lines in FIG. 3 and the other positions are indicated by broken lines in that Figure. The angle between the rearmost position and the intermediate position is about 50° and that between the intermediate position and the foremost position is about 15°. The tines 35 each have a bent end 60. In the intermediate tine position indicated by solid lines the end 60 is directed forwardly in the direction of rotation B and is at an angle of about 26° to a radial line S passing through the junction of the end 60 and the portion of the tine 35 joining the coil. In the rearmost position indicated by broken lines the end 60 is at a very small angle to the radial line S and is preferably directed slightly rearwardly. In the foremost position the angle of the end 60 exceeds that in the intermediate position. The portion of the tine joining the coil is largely directed to the rear because the two portions of the tine are at an angle of about 150° to each other. In this embodiment the construction of the lower tine corresponds with that of the topmost tine. Around the bolt 36 and within the sleeve 43 fits a tube 61 with some clearance. The structure is such that the tine carrier 38 with the tines can turn about the bolt 36 so that the tines can match the unevennesses of the ground. The tube 39 has a small opening 62 and the limb 54 also has a small hole 63. A helical spring 64 surrounds the sleeve 43. One end of this spring 64 is inserted into the opening 62 and the other end is located in the hole 63. This spring is stressed and disposed so that the bracket 52 is turned upwardly and abuts the loop which is received in one of the recesses 57, 58 or 59.

Each of the supporting tubes 10 is provided with a downwardly extending tube 65. This tube 65 is provided with a plurality of resilient spring steel rods 66 which are located substantially in a common vertical plane and extend substantially parallel to the path of the tines and hence to the ground. The lower rods are shorter that the topmost rods. This tube 65 and the rods 66 form a side wall of a crop guiding arrangement.

FIG. 1 shows that the side walls formed by the tubes 65 and the rods 65 converge rearwardly. The side walls of the guide arrangement are located at least partly over the paths b of the tines. The side walls terminate approximately at the location of the beam 2, that is to say approximately at a plane including the rotary shafts 5 and 6. At this location the distance between the side walls exceeds 20 cms. If desired, the spring steel rods may be partly provided with plastic tips 67 to prevent fatigue vibrations (see FIG. 6). The two lower rods of the guide member have a length approximately equal to two thirds of the length of the uppermost rods with their plastic tips. Viewed on plan, the angle between the wo side walls is about 25°. The lower portion of each side wall is located substantially parallel to and at some distance above the ground, the distance of the lower side from the ground being preferably slightly greater than the distance of the tips of the lower tines 35 and in some cases, even of the upper tines 35 from the ground. FIG. 6 shows on an enlarged scale a side surface of a guide member, in which upper four rods 66 are provided with flexible extensions of a synthetic substance. The lower bars are significantly shorter. The height of the guide member is about 40 cms. If desired, the side walls may be made from sheet material.

The machine operates as follows.

The machine can be used both as a tedder and as a swath former. In the operative position as a swath former, the guides, formed by the rods 18 occupy their operative positions indicated in solid lines in FIGS. 1 and 2. The rake members are caused to rotate in the directions indicated by the arrows B and displace grass or hay to the rear, the crop being deposited in the form of a swath by rods 18. For forming swaths, the tines 35 occupy the rearmost operative position indicated in FIG. 3 by broken lines. In the tedder position, the swath-forming rods 18 are put out of operation by turning them about the shafts 16 so that the guides lie on top of the machine. The rake members are driven in the same manner and the crop is deposited behind the machine on the ground and intensively tedded. For tedding most crops, the tines 35 occupy the position indicated by solid lines in FIG. 3 which is the normal position for tedder operation. However, the tines may be turned to the foremost position so that the tines are further inclined (dash-dot lines in FIG. 3). This is desirable for working heavy, wet grass. During operation the tines can follow unevennesses of the ground, both since they are freely pivotable about the bolt 36 and since the arms 31 with the pivotal shafts 30 can turn in the openings 26, 27, 28 and 29 respectively. This permits the use of rake members having a large diameter such that the machine as a whole may have a width of about 4 meters. The change-over of the tines from one operating position into another can be readily performed because the loop 51 is resilient and can be drawn out of the recesses 57, 58 or 59. When the portion of the loop, in this case, the upper portion is lifted out of a recess, the tines can be turned, with its coil, around the tube 39 acting as a bearing, until the loop snaps into another recess. The tine is fastened to the tube 39 by the sleeve 43, the tube 61 and the nut 37, while the bracket 44 operating as a strap ensures a firm location. Contrary to many known constructions the machine embodying the invention is found to have a very low incidence of tine fracture The crop is thrown up at high speed, since the tips of the tines describe a path having a large diameter and are rotated at a rate of about 110 rev/min by the power take-off shaft of the tractor; also, the tines have an end portion 60 of about one sixth of the length of the tine. The throwing of the crop by one rake wheel onto the arms of the tines of the other rake wheel is to be avoided, and this is particularly important because the rake member has a large diameter of more than 2 meters and forms a particularly low construction with movable arms and tines, whereas the central part formed by the hub 19 and the rim 21 has a comparatively small diameter, i.e., only about one third of the diameter of the path described by the tips of the tines. The arms and the tines, having substantially equal lengths as each other, thus constitute a particularly large, flat portion of the rake member. For this reason the guide arrangements comprising the side walls formed by the tube 65 and the rods 66 are provided. These side walls which coverage rearwardly convey the crop to a location between the two rake members and feed a considerable portion of the crop to that location, i.e., the crop lying on a strip of ground having a width equal to the distance between the fronts of the side walls, which distance is approximately equal to the radius of a rake member, as is shown in FIG. 1. The effect of the guide arrangement is enhanced because the side walls do not extend down to the ground, which might otherwise give rise to stripping up of crop. The side walls are at a height above the ground which approximately corresponds with the height of the tips of the upper tines above the ground, and is preferably slightly greater than the height of the lower tines above the ground, for example, about 5 or 10 cms. With this disposition of the side walls 18, the tines can displace the crop, if the layer is not too high, beneath the side walls towards the center of the machine, the crop being also conveyed via the two converging side walls to the central region between the two rake members. If the layer of crop is thick, some of the crop is passed from beneath the side walls towards the center of the machine, whereas a further portion of the crop arrives at the side walls and is guided along the outer sides of the side walls over and across the rake members towards the center of the machine. The flat shape of the tines and the carriers permit of displacing a large quantity of hay across this part of the rake members and since the guide arrangement extends substantially midway between the rake members and beneath the beam 2 a uniform distribution of the crop behind the machine is achieved or, when the guide member comprising the rods 18 is employed, it is deposited in the form of a swath. It has been found to be desirable for the lower rods of the side walls to be shorter than the upper rods, so that if the layer of crop is not too thick any excess quantity is displaced as much as possible on the outer side of the rake member. If the machine is equipped with groups of tines, as described in this embodiment, the lower rod of the guide may extend between the tines of the group, i.e., the upper tines pass through the gap between two rods. It should be noted that the machine can be moved into a transport position by tilting the arms 31 upwardly about the pivotal shafts 30, while the tines can turn downwardly about the bolt 36, the machine being, so to say, folded up. The machine may be provided with means, for example, hooks to fix the arms and the tines in this folded-up position. Owing to the disposition of the guides 68, the tines can be moved into a transport position without the movement of the tines being hindered by the rods 66.

The machine described may also be employed successfully for working near ditch edges. In this case the tines of the rake member farthest remote from the ditch edge can be set in the normal tedding position. The rake member located near the ditch has its tines set in the position indicated in FIG. 3 by dash-dot lines.

While various features of the hay making machine that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. A haymaking machine comprising a frame and at least two side-by-side rake members rotatably mounted on said frame, driving means connected to drive said members in mutually opposite directions of rotation about respective upwardly extending axes to a central region between said members, each rake member having tines with crop working portions extending outwardly from their axes of rotation and generally parallel to the ground during operation, a crop guide assembly supported on the frame and positioned in front of said members with respect to the normal direction of machine travel, said assembly comprising two upwardly extending side walls which converge towards the rear, said walls being positionable above the ground and between said rake members, said walls defining respective planes each of which intersects the path of movement of the tines of a corresponding rake member.

2. A haymaking machine as claimed in claim 1, wherein said walls extend rearwardly to a position adjacent a plane containing the rotary axes of said rake members.

3. A haymaking machine as claimed in claim 2, wherein the rear ends of said walls are spaced apart from one another.

4. A haymaking machine as claimed in claim 3, wherein the distance between said rear ends is at least 20 centimeters.

5. A haymaking machine as claimed in claim 3, wherein the lower edges of said walls extend substantially parallel to the ground.

6. A haymaking machine as claimed in claim 5, wherein said lower edges are spaced above the ground by at least about 5 centimeters.

7. A haymaking machine as claimed in claim 1, wherein each side wall comprises resilient rods which extend rearwardly substantially parallel to the ground.

8. A haymaking machine as claimed in claim 7, wherein the lowermost rod is shorter than the uppermost rod.

9. A haymaking machine as claimed in claim 8, wherein said lowermost rod as viewed in plan, overlaps the tine path of the corresponding rake member.

10. A haymaking machine as claimed in claim 9, wherein said tines are arranged in groups of superposed tines and the upper tines of said groups move between adjacent rods of said walls during operational rotation.

11. A haymaking machine as claimed in claim 8, wherein said rods have rear portions of resilient synthetic resin.

12. A haymaking machine as claimed in claim 11, wherein said portions of synthetic resin each have a length substantially equal to one third of the total length of the respective rod.

13. A haymaking machine as claimed in claim 1, wherein the front ends of said walls are spaced apart from each other by a distance greater than half the radius of the working radius of either rake member.

14. A haymaking machine as claimed in claim 13, wherein the distance between the front ends of said walls is substantially equal to said working radius.

15. A haymaking machine as claimed in claim 1, wherein each rake member has a central portion having a diameter not greater than half the diameter of the working radius of said member, said arms defining a substantially planar portion, when viewed from the side, that is substantially parallel to the ground during operation.

16. A haymaking machine as claimed in claim 15, wherein said arms are pivotably connected to the central portion and pivotable upwardly and downwardly.

17. A haymaking machine as claimed in claim 16, wherein said tines are freely pivotable on respective arms and upwardly and downwardly turnable.

18. A haymaking machine as claimed in claim 17, wherein said tines and arms are of substantially equal lengths.

19. A haymaking machine as claimed in claim 15, wherein pivotal shafts interconnect the arms to the central portion and said shafts are inclined with respect to their directions of normal rotation.

20. A haymaking machine as claimed in claim 19, wherein the trailing end of each shaft is nearer to the rotary axis of said rake member than is the leading end of that shaft.

21. A haymaking machine as claimed in claim 20, wherein the angle between the axis of said shaft and its direction of movement is about 20°.

22. A haymaking machine as claimed in claim 19, wherein further pivotal shafts interconnect the tines to the outer ends of said arms and said further shafts are inclined to the normal direction of rotational movement during operation.

23. A haymaking machine as claimed in claim 22, wherein the angle of inclination between the further shaft of each tine and its direction of movement is about 20°.

24. A haymaking machine as claimed in claim 22, wherein each tine is mounted on a carrier and a spring biases said carrier with tine upwardly about the axis defined by the corresponding further shaft.

25. A haymaking machine as claimed in claim 24, wherein said tines are displaceable relative to their respective arms about upwardly extending setting axes which are parallel to the rotational axis of the rake member.

26. A haymaking machine as claimed in claim 25, wherein each tine is displaceable to any one of three different operating positions about its setting axis.

27. A haymaking machine as claimed in claim 26, wherein in a first operating position, the end of said tine points rearwardly with respect to the normal direction of rotation of the rake member and in a second position, the end of the tine points forwardly.

28. A haymaking machine as claimed in claim 27, wherein in an intermediate third operating position, the end of said tine points forwardly.

29. A haymaking machine as claimed in claim 28, wherein each tine must be displaced from the first operating position through about 65° to bring it into the second operating position and through about 50° to bring it into said third position.

30. A haymaking machine as claimed in claim 26, wherein said tine is turnable about said carrier and the latter is fastened to a horizontal pin which comprises said further shaft at the end of the respective arm.

31. A haymaking machine as claimed in claim 30, wherein said tine has coils that surround said carrier and afford a bearing with which the tine turns on the carrier.

32. A haymaking machine as claimed in claim 31, wherein each arm mounts a group of two tines the coils of which are interconnected by a loop, said coils being located one on each side of said pin.

33. A haymaking machine as claimed in claim 32, wherein a bracket is fastened on said pin, said bracket having recesses that receive the respective tine in its different operating positions.

34. A haymaking machine as claimed in claim 33, wherein said loop extends around said bracket.

35. A haymaking machine as claimed in claim 34, wherein the further shaft is journalled in a transverse sleeve and each carrier comprises a tube which houses means that clamps said sleeve to the carrier.

36. A haymaking machine comprising a frame and at least two side-by-side rake members rotatably mounted on said frame, driving means connected to drive said members in mutually opposite directions of rotation about respective upwardly extending axes to a central region between said members, each rake member having tines with crop working portions extending outwardly from their axes of rotation and generally parallel to the ground during operation, a crop guide assembly supported on the frame and positioned in front of said members with respect to the normal direction of machine travel, said assembly comprising two upwardly extending side walls which converge towards the rear, said walls having horizontal rods and being normally positioned substantially above the ground and at least some of said rods being located above and intersecting the working paths of said tines during rotation thereof, when viewed in plan, further guides being positioned at the rear of said rake members and said further guides being pivoted to the frame.

* * * * *